United States Patent [19]

Morimoto

[11] Patent Number: 4,672,864
[45] Date of Patent: Jun. 16, 1987

[54] CONTROL SYSTEM FOR AN INFINITELY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 796,474

[22] Filed: Nov. 8, 1985

[30] Foreign Application Priority Data

Nov. 16, 1984 [JP] Japan ................. 59-241956

[51] Int. Cl.$^4$ .................. B60K 41/12; B60K 41/18
[52] U.S. Cl. .................................. 74/866; 474/28; 364/424.1
[58] Field of Search ............... 74/866, 864, 865; 474/11, 12, 18, 28, 70; 364/424.1

[56] References Cited

U.S. PATENT DOCUMENTS

| | | | |
|---|---|---|---|
| 4,387,608 | 6/1983 | Mohl et al. | 74/866 |
| 4,458,318 | 7/1984 | Smit et al. | 364/424.1 |
| 4,458,560 | 7/1984 | Frank et al. | 74/857 |
| 4,466,521 | 8/1984 | Hattori et al. | 74/866 |
| 4,470,117 | 9/1984 | Miki et al. | 364/424.1 |
| 4,509,125 | 4/1985 | Fattic et al. | 364/424.1 |
| 4,515,040 | 5/1985 | Takeuchi et al. | 74/866 |
| 4,515,041 | 5/1985 | Frank et al. | 74/866 |
| 4,546,673 | 10/1985 | Shigematsu et al. | 74/866 |
| 4,584,907 | 4/1986 | Niwa et al. | 74/866 |

Primary Examiner—Allan D. Herrmann
Assistant Examiner—Dirk Wright
Attorney, Agent, or Firm—Martin A. Farber

[57] ABSTRACT

An infinitely variable transmission comprises a drive pulley having a hydraulically shiftable disc, a driven pulley having a hydraulically shiftable disc, and a belt engaged with both pulleys. The system has a pressure oil circuit having a line pressure control valve having a spool for controlling line pressure, and a transmission ratio control valve having a spool for controlling the pressurized oil to change the transmission ratio. A first electromagnetic valve is provided for controlling control pressure applied to the spool of the line pressure control valve in accordance with desired transmission ratio and engine torque, and a second electromagnetic valve is provided for controlling control pressure applied to the spool of the transmission ratio control valve in accordance with the desired transmission ratio and actual transmission ratio.

11 Claims, 6 Drawing Figures

CONTROL SYSTEM FOR AN INFINITELY VARIABLE TRANSMISSION

BACKGROUND OF THE INVENTION

The present invention relates to a hydraulic pressure control system for an infinitely variable belt-drive automatic transmission for a vehicle.

A known control system for an infinitely variable belt-drive transmission comprises an endless belt running over a drive pulley and a driven pulley. Each pulley comprises a movable conical disc which is axially moved by a fluid-operated servo device so as to vary the running diameter of the belt on the pulley in dependency on driving conditions. The system is provided with a line pressure control valve and a transmission ratio control valve. Each valve comprises a spool to control the oil supplied to the servo devices.

The transmission ratio control valve operates to provide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output torque of the engine. Recently, a control system has been proposed in which the transmission ratio is controlled so as to meet the requirement of small fuel consumption. In such a system, the line pressure also should be controlled to improve the fuel consumption. However, the conventional system, which controls the line pressure in accordance with the transmission ratio and engine speed, can not properly control the line pressure.

SUMMARY OF THE INVENTION

The object of the present invention is to provide a system which controls the transmission ratio of a continuously variable transmission such that a motor vehicle can be driven at low fuel consumption by the system, and controls the line pressure in the system in dependency on the transmission ratio.

According to the present invention, there is provided a system for controlling an infinitely variable transmission for transmitting the power of an internal combustion engine comprising a drive pulley having a hydraulically shiftable disc and a hydraulic cylinder for shifting the disc, and a driven pulley having a hydraulically shiftable disc and a hydraulic cylinder for operating the disc, a belt engaged with both pulleys, and a pressure oil circuit having a pump for supplying oil, a line pressure control valve having a spool for controlling line pressure, a transmission ratio control valve having a spool for controlling the pressurized oil so as to move the disc of the drive pulley to change the transmission ratio. The system comprises a first hydraulic circuit for applying control pressure to one end of the spool of the line pressure control valve so as to axially move the spool, a second hydraulic circuit for applying control pressure to one end of the spool of the transmission ratio control valve so as to axially move the spool, an electronic control unit responsive to throttle position of the engine, engine speed, and actual transmission ratio for producing an output signal, the electronic control unit comprising means for calculating a desired transmission ratio and for producing a second output signal representing the quantity of shifting the spool of the transmission ratio control valve to attain the desired transmission ratio, means for detecting engine torque, and means responsive to the desired transmission ratio and to the engine torque for producing a first output signal, a first electromagnetic valve provided in the first hydraulic circuit and having a coil responsive to the first output signal for controlling the control pressure applied to the spool of the line pressure control valve, and a second electromagnetic valve provided in the second hydraulic circuit and having a coil responsive to the second output signal for controlling the control pressure applied to the spool of the transmission ratio control valve, whereby the transmission ratio and line pressure are controlled to transmit the engine torque.

The other objects and features of this invention will become understood from the following description with reference to the accompanying drawings.

DETAILED DESCRIPTION OF THE PREFERRED EMBODIMENT

Figure 1:
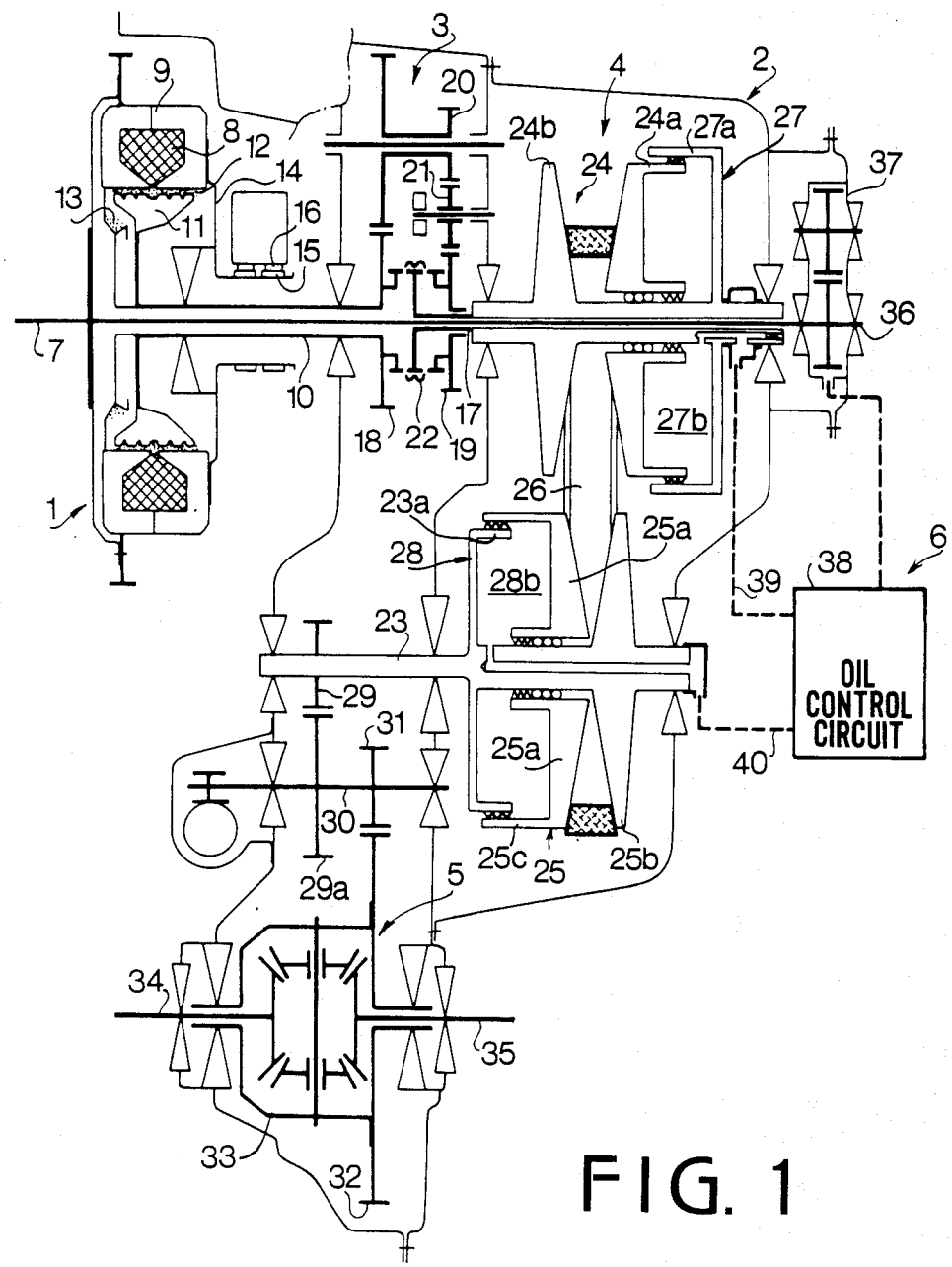
FIG. 1 is a schematic illustration of an infinitely variable belt-drive transmission.

Referring to FIG. 1, the infinitely variable belt-drive automatic transmission for a motor vehicle to which the present invention is applied, comprises an electromagnetic powder clutch 1, an infinitely variable belt-drive transmission 2, a selector mechanism 3, pulleys and a belt device 4, a final reduction device 5, and an oil control circuit 6. A crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and driven member 11. In the powder chamber 13, magnetic powder is provided. The driven member 11 is secure to an input shaft 10 of the belt-drive transmission. A holder 14 secured to the drive member 9 carries slip rings 15 which are electrically connected to the coil 8. The coil 8 is supplied through brushes 16 and the slip rings 15 with control current from a electronic control circuit (not shown).

When the magnetizing coil 8 is excited by clutch current, the drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially to the input shaft 10. The selector device 3 comprises a drive gear 18 integral with the input shaft 10, a reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged with the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer 22 is engaged with the gear 18, the input shaft 10 is connected to the main shaft 17 through the synchronizer 22 to provide a driving position (D range).

When the synchronizer 22 is engaged with the gear 19, the input shaft 10 is connected to the main shaft 17 through gears 18, 20, 21 and 19 to provide a reverse driving position (R range).

The main shaft 17 has an axial passage in which an oil pump driving shaft 36 connected to the crankshaft 7 is mounted. An output shaft 23 is provided in parallel with the main shaft 17. A drive pulley (primary pulley) 24 and a driven pulley (secondary pulley) 25 are mounted on shafts 17 and 23 respectively. A fixed conical disc 24b of the drive pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber 27b of the servo device 27 communicates with the an oil pump 37 through a passage 39 and a control circuit 38. The oil pump 37 is a gear pump driven by the shaft 36.

A fixed conical disc 25b of the driven pulley 25 is formed on the output shaft 23 opposite the movable conical disc 24a and an axially movable conical disc 25a is slidably mounted on the shaft 23 opposite disc 24b. The movable conical disc 25a has a cylindrical portion 25c in which a piston portion 28a of the output shaft 23 is slidably engaged to form a servo device 28. A chamber 28b of the servo device 28 is communicated with the oil pump 37 through a passage 40 and the control circuit 38. A drive belt 26 engages with the drive pulley 24 and the driven pulley 25.

Secured to the output shaft 23 is a drive gear 29 which engages with an intermediate reduction gear 29a on an intermediate shaft 30. An intermediate gear 31 on the shaft 30 engages with a final gear 32. Rotation of the final gear 32 is transmitted to axles 34 and 35 of the vehicle driving wheels (not shown) through a differential 33.

Figure 2:
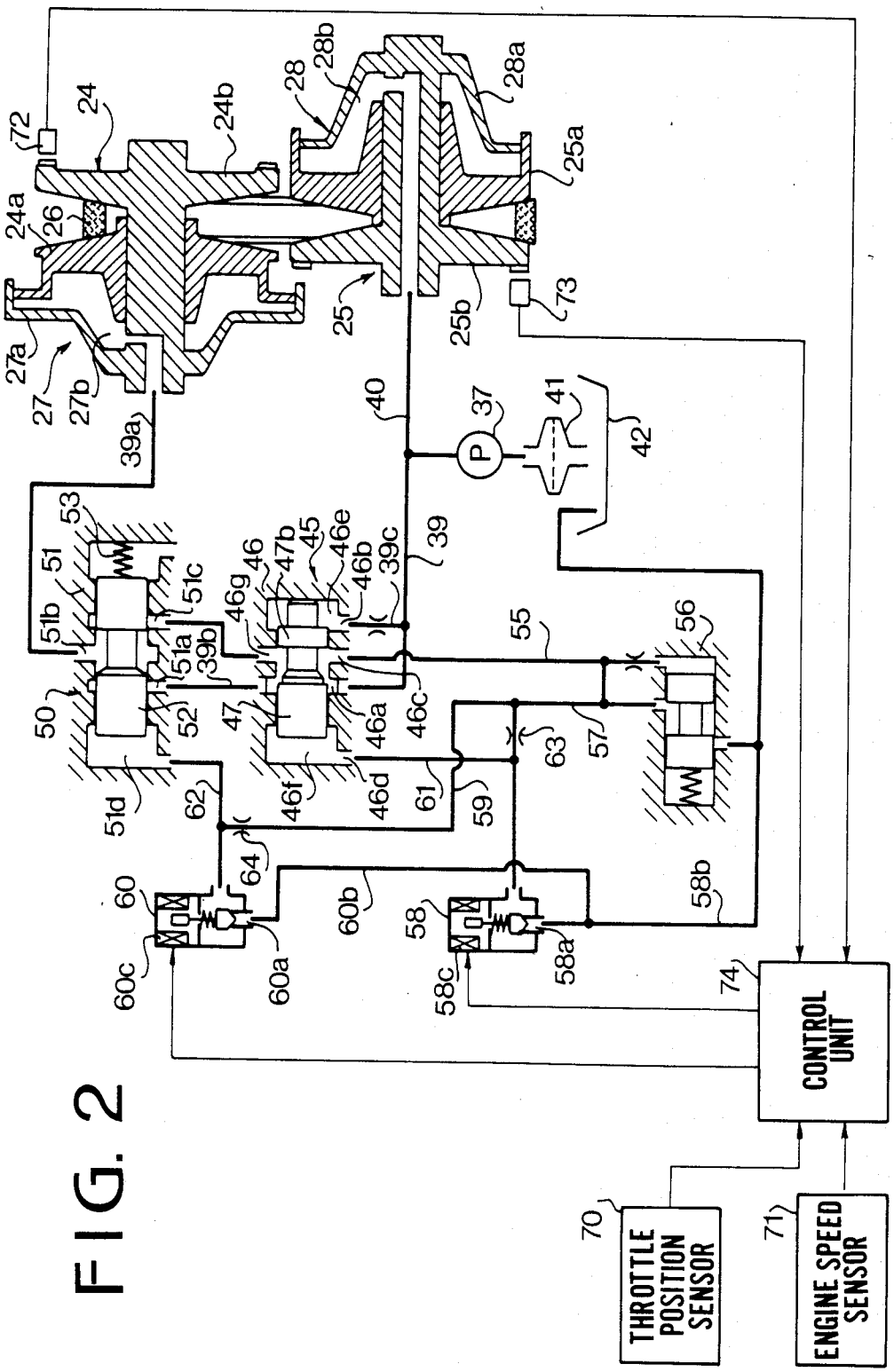
FIG. 2 is a schematic diagram showing a control system according to the present invention.

Referring to FIG. 2, the chamber 27b of the servo device 27 is applied with pressurized oil by the oil pump 37 from an oil reservoir 42 passing through a filter 41, a conduit 39, a line pressure control valve 45 and a transmission ratio control valve 50. The chamber 28b of servo device 28 is applied with pressurized oil at a secondary pressure through passage 40 without passing through the valves 45 and 50. The movable conical disc 24a of the drive pulley 24 is so designed that the pressure receiving area thereof is larger than that of the movable conical disc 25a of the driven pulley 25. The line pressure control valve 45 comprises a valve body 46, a spool 47, and end chambers 46e and 46f. A land 47b of the spool 47 is applied with pressure of the pressure oil in the chamber 46e supplied through a conduit 39c and a port 46b. The other end of the spool 47 is applied with the pressure of the oil in the chamber 46f supplied from a port 46d. An annular groove 46a connected with conduit 39 is communicated with a conduit 39b and communicated with a port 46c in accordance with the position of the left-hand land of the spool 47.

The transmission ratio control valve 50 comprises a valve body 51, a spool 52, and a spring 53 for urging the spool in the upshift direction. A port 51b of the valve 50 is selectively communicated with a pressure oil supply port 51a or a drain port 51c in accordance with the position of lands of the spool 52. The port 51b communicates with the chamber 27b through a conduit 39a, and the port 51a communicates with the line pressure control valve 45 through the conduit 39b. The drain port 51c communicates with ports 46g and 46c of the line pressure control valve 45. An end chamber 51d of the transmission ratio control valve 50 is applied with control pressure through a line 62.

Thus, the spool 52 is shifted in dependency on the control pressure and on the spring 53 to change the transmission ratio of the pulley-belt transmission.

The drain port 46c communicates with oil reservoir 42 through a conduit 55 and a pressure regulator valve 56 which operates to keep the pressure of oil in the conduit 55 constant. The pressure in conduit 55 is applied to the chambers 46f and 51d of the line pressure control valve 45 and the transmission ratio control valve 50 through conduits 57, 61, 59 and 62, respectively. The oil pressure applied to the chamber 46f is also applied to a solenoid operated valve 58, and the pressure applied to the chamber 51d is applied to a solenoid operated valve 60. Drain ports 58a and 60a of both valves 58 and 60 are communicated with the oil reservoir 42 through conduits 58b and 60b. The valves 58, 60 are opened by exciting solenoids (coils) 58c and 60c, respectively. Thus, the pressure applied to each chamber is controlled by controlling the excitation of each solenoid. Orifices 63 and 64 are provided so as to prevent fluctuation of pressure applied to each chamber, which is caused by the operation of the solenoid operated valves.

A throttle position sensor 70, an engine speed sensor 71, drive and driven pulley speed sensors 72 and 73 are provided for producing respective signals which are supplied to a control unit 74. The control unit 74 produces control signals for operating the solenoid operated valves 58 and 60.

Figure 4:
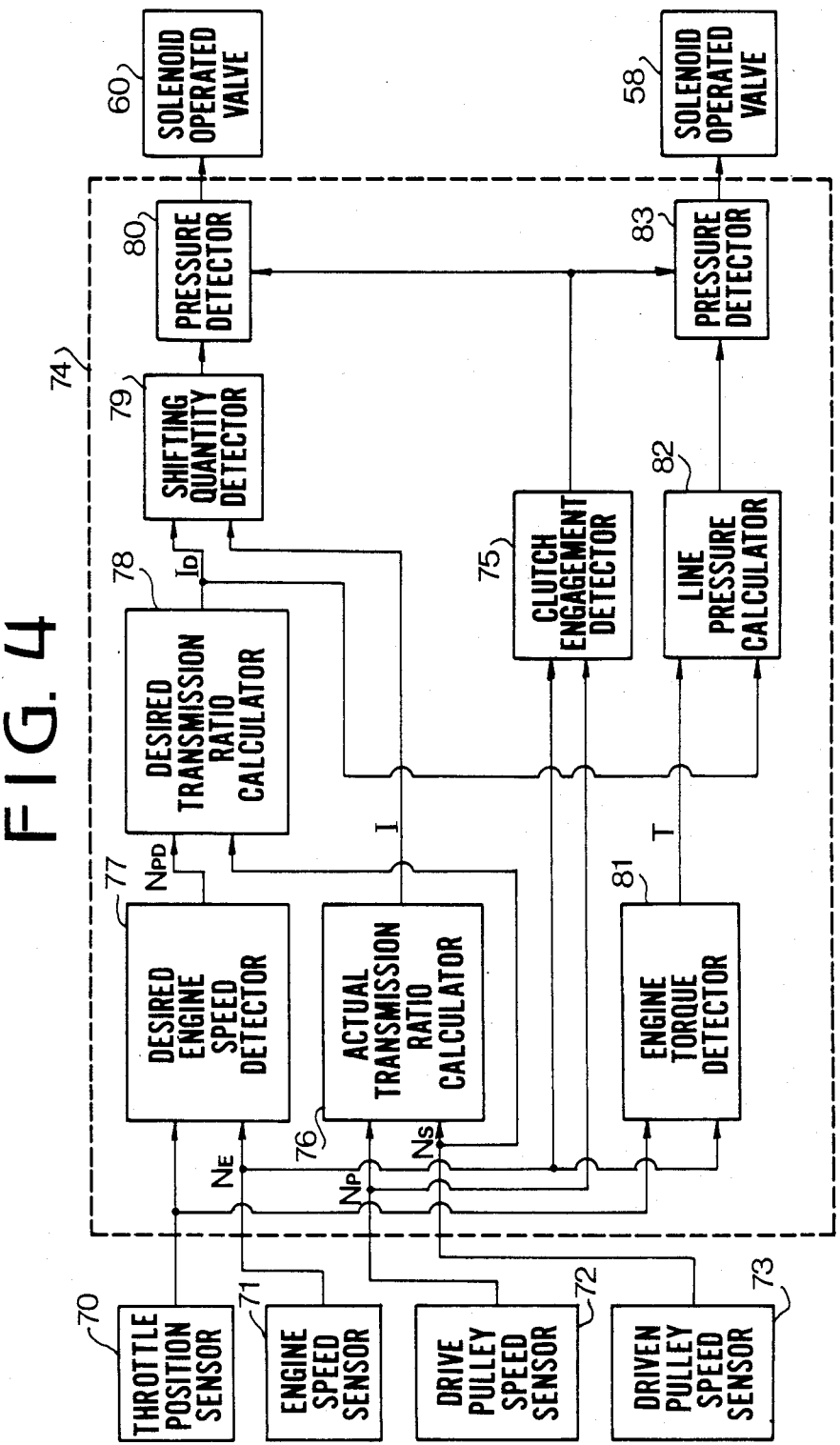
FIG. 4 is a block diagram showing a control unit.

Explaining a transmission ratio control system with reference to FIG. 4, an engine speed signal NE from engine speed sensor 71 and a drive pulley speed signal $N_P$ from drive pulley speed sensor 72 are fed to a clutch engagement detector 75 which produces a clutch engagement signal when the signal NE coincides with signal $N_P$. Signal $N_P$ and a driven pulley speed signal $N_S$ from driven pulley speed sensor 73 are supplied to an actual transmission ratio calculator 76 which calculates the actual transmission ratio $I(N_P/N_S)$. A desired engine speed detector 77 is applied with a throttle position signal from throttle position sensor 70 and the engine speed signal NE. A table is provided storing desired engine speed in accordance with throttle position and engine speed. The desired engine speed detector 77 produces the desired engine speed signal $N_{PD}$ from the table.

Figure 5A:
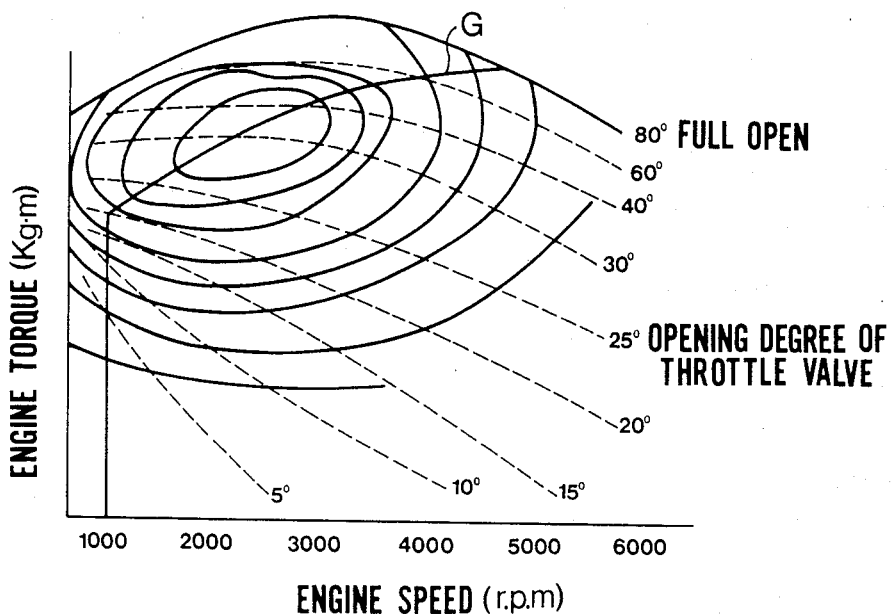
FIGS. 5a and 5b show minimum fuel consumption lines.
Figure 5B:
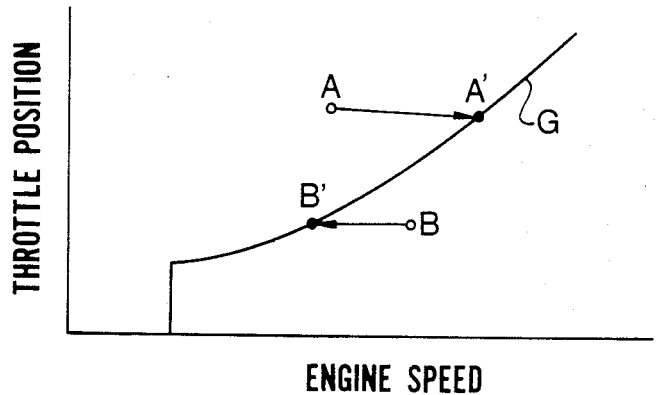

FIG. 5a shows a minimum fuel consumption line G based on engine speed and engine torque. The line G can be represented in accordance with engine speed and throttle position as shown in FIG. 5b. The table for the desired engine speed is prepared from the graph of FIG. 5b.

A desired transmission ratio calculator 78 is applied with the desired engine speed signal $N_{PD}$ and the driven pulley speed signal $N_S$ to produce a desired transmission ratio ID ($N_{PD}/N_S$).

Output signals I and ID of the actual transmission ratio calculator 76 and the desired transmission ratio calculator 78 are fed to a shifting quantity detector 79 which produces an output signal representing the quantity for upshifting or downshifting the spool 52 of the transmission ratio control valve 50. The output signals of shifting quantity detector 79 and the clutch engagement detector 75 are applied to a pressure detector 80 which produces an output signal which determines the control pressure for transmission ratio. The output signal of the detector 80 comprises pulses, the duty ratio of which is determined by the output signal and is applied to the solenoid operated valve 60.

On the other hand, a line pressure control system is as follows. An engine torque detector 81 is applied with the output signals of the throttle position sensor 70 and engine speed sensor 71 which detects the engine torque from a table based on the graph of FIG. 5a. The output signal T of the engine torque detector 81 and the output signal ID of the desired transmission ratio calculator 78 are applied to a line pressure calculator 82 which calculates the line pressure which is necessary to transmit the torque at the desired transmission ratio. The output signals of the line pressure calculator 82 and the clutch engagement detector 75 are fed to a pressure detector 83 which determines the line pressure dependent on the signals. The output of the pressure detector 83 is in the form of a pulse train which is applied to the solenoid operated valve 58 to operate it at the duty ratio of the pulse train.

In operation, the solenoid operated valves 58 and 60 are operated by signals from the control unit 74 at respective duty ratios. By the operation of the valve 58, the amount of drain oil is controlled to produce a control pressure which is applied to the chamber 46f of the line pressure control valve 45 through the line 61. On the other hand, the control pressure determined by control of the valve 60 is applied to the chamber 51d of the transmission ratio control valve 50 through the line 62. The transmission ratio control valve 50 is operated by the control pressure to apply the line pressure to the chamber 27b of the servo device 27 or to drain the chamber, so that the transmission ratio is controlled.

Figure 3:
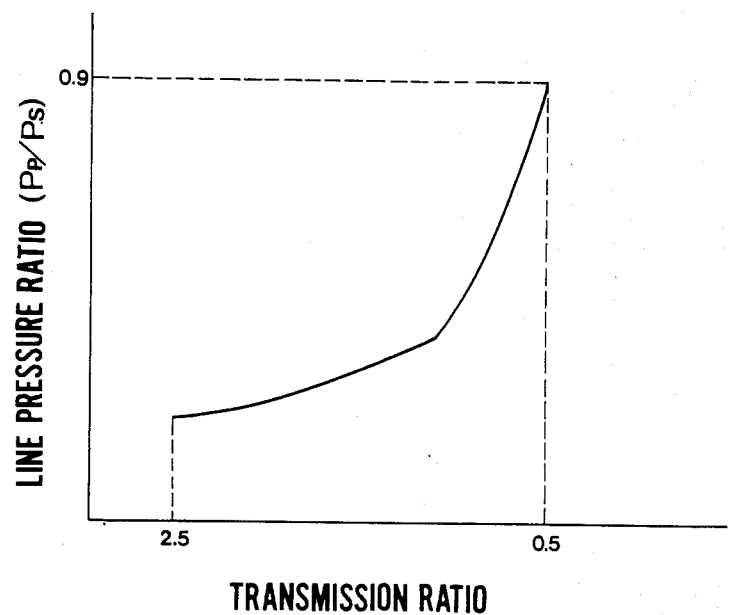
FIG. 3 is a graph showing the relationship between transmission ratio and line pressure ratio.

FIG. 3 shows the relationship between the transmission ratio and the ratio of the line pressure ($P_P$) applied to the drive pulley 24 to the line pressure ($P_S$) applied to the driven pulley 25. From the graph of FIG. 3, it will be seen that the transmission ratio can be controlled by controlling the line pressure Pp for the drive pulley.

Explaining the control operation with reference to FIG. 4, the shifting quantity detector 79 produces a signal dependent on the desired transmission ratio signal ID and the actual transmission ratio signal I. The output signal of the detector 79 represents the shifting quantity of the spool 52 of the valve 50.

Referring to FIG. 5b, the fact that an actual engine speed A is lower than the desired engine speed A' on the minimum fuel consumption line G means that the actual transmission ratio I is lower than the desired transmission ratio ID. Accordingly the transmission must be downshifted in this example. The detector 79 produces an output signal corresponding to the quantity (amount of the downshifting to the desired transmission ratio. Namely, the duty ratio of the output pulses applied to the solenoid operated valve 60 is reduced so as to increase the control pressure applied to the chamber 51d. Accordingly, the spool 52 is moved to the right (downshift direction) to drain the chamber 27b. Thus, the movable disc 24a is moved to the left to increase the transmission ratio, whereby engine speed is increased in order to maintain the speed of the vehicle constant. To the contrary, when an actual engine speed B is higher than the desired engine speed B', the duty ratio of the output pulses is increased so as to move the spool 52 to the left. Accordingly, the line pressure is applied to the chamber 27b to upshift the transmission. Thus, the engine speed is reduced.

On the other hand, the desired transmission ratio signal ID and the engine torque signal T are applied to the line pressure calculator 82 which produces a signal representing line pressure dependent on the signals ID and T. Thus, in accordance with the system, the line pressure is properly controlled so as to transmit the torque of the engine to the output shaft of the transmission.

Although the above-described system is provided with a hydraulic system for controlling the transmission ratio and line pressure, the control can also be performed by electronic actuators.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a system for controlling an infinitely variable transmission for transmitting the power of an internal combustion engine having a throttle, a clutch operatively connecting the engine to the transmission, the transmission comprising a drive pulley having a hydraulically shiftable first disc and a first hydraulic cylinder for shifting the first disc, a driven pulley having a hydraulically shiftable second disc and a second hydraulic cylinder for operating the second disc, and a belt engaged with both pulleys, the system comprising a pressure oil circuit having a pump for supplying oil for the cylinders, a line pressure control valve having a first spool for controlling line pressure of pressurized oil from the pump, and a transmission ratio control valve having a second spool for controlling the pressurized oil so as to move the first disc of the drive pulley to change the transmission ratio of the transmission, the improvement in the system comprising:

a first hydraulic circuit for applying a first control pressure to one end of the first spool of the line pressure control valve so as to axially move the first spool;

a second hydraulic circuit for applying a second control pressure to one end of the second spool of the transmission ratio control valve so as to axially move the second spool;

an electronic control unit comprising first means responsive to throttle position of the engine for producing a desired engine speed, second means responsive to the desired engine speed and to speed of the driven pulley for calculating a desired transmission ratio, third means responsive to speeds of the drive pulley and driven pulley for producing a signal corresponding to actual transmission ratio, fourth means responsive to the desired transmission ratio and to the actual transmission ratio for producing a first output signal representing an amount of shifting of the second spool of the transmission ratio control valve, fifth means responsive to the engine speed and to the throttle position of the engine for detecting engine torque, sixth means responsive to the desired transmission ratio and the engine torque for producing a second output signal, seventh means for producing a clutch engagement signal during engagement of the clutch, and eighth means responsive to the clutch engagement signal for passing the first and second output signals;

a first electromagnetic valve provided in the first hydraulic circuit and having a first coil responsive to the passing second output signal for controlling the first control pressure applied to the first spool of the line pressure control valve; and a second electromagnetic valve provided in the second hydraulic circuit and having a second coil responsive to the passing first output signal for controlling the second control pressure applied to the second spool of the transmission ratio control valve, whereby the transmission ratio and the line pressure are controlled to transmit the engine torque.

2. The system according to claim 1, wherein each of the first and second output signals is in the form of a pulse train, a duty ratio of which determines the control pressures.

3. The system according to claim 1, wherein the desired engine speed is determined for operating at a minimum fuel consumption.

4. The system according to claim 1, wherein said second output signal controls said line pressure control valve so as to provide said line pressure at a value so as to transmit the detected engine torque at said desired transmission ratio.

5. The system according to claim 1, wherein said throttle position, said detected engine torque, and said speed of the driven pulley remain unchanged by all of said means and the desired engine speed, the desired transmission ratio and said line pressure are changed to new actual values by corresponding of said means.

6. The system according to claim 1, wherein said pressure oil circuit includes a drain line from said line pressure control valve, said drain line communicates with said first and second hydraulic circuits, and a pressure regulator valve means for keeping the pressure in said drain line constant.

7. The system according to claim 1, wherein said seventh means produces said clutch engagement signal when the engine speed equals the speed of said drive pulley.

8. The system according to claim 1, wherein said first means is also responsive to engine speed.

9. In a system for controlling an infinitely variable transmission for transmitting the power of an internal combustion engine having a throttle, a clutch operatively connecting the engine to the transmission, the transmission comprising a drive pulley having a hydraulically shiftable first disc and a first hydraulic cylinder for shifting the first disc, a driven pulley having a hydraulically shiftable second disc and a second hydraulic cylinder for operating the second disc, and a belt engaged with both pulleys, the system comprising a pressure oil circuit having a pump for supplying oil for the cylinders, a line pressure control valve having a first spool for controlling line pressure of pressurized oil from the pump, and a transmission ratio control valve having a second spool for controlling the pressurized oil so as to move the first disc of the drive pulley to change the actual transmission ratio of the transmission, the improvement in the system comprising:

a first hydraulic circuit for applying first control pressure to one end of the first spool of the line pressure control valve so as to axially move the first spool;

a second hydraulic circuit for applying second control pressure to one end of the second spool of the transmission ratio control valve so as to axially move the second spool;

an electronic control unit comprising first means operatively responsive to throttle position of the engine and to speed of the driven pulley for calculating a desired transmission ratio corresponding to a desired engine speed for a minimum fuel consumption, second means for producing a signal corresponding to the actual transmission ratio, third means responsive to the desired transmission ratio and to the actual transmission ratio for producing a first output signal representing an amount of shifting of the second spool of the transmission ratio control valve so as to provide said desired transmission ratio, and fourth means responsive to the throttle position of the engine for detecting engine torque and to the desired transmission ratio for producing a second output signal for transmitting engine torque at said desired transmission ratio;

a first electromagnetic valve provided in the first hydraulic circuit and having a first coil responsive to the second output signal for controlling the first control pressure applied to the first spool of the line pressure control valve; and a second electromagnetic valve provided in the second hydraulic circuit and having a second coil responsive to the first output signal for controlling the second control pressure applied to the second spool of the transmission ratio control valve, whereby the transmission ratio and the line pressure are controlled to transmit the engine torque.

10. The system according to claim 9, wherein said fourth means comprises an engine torque detector for detecting engine torque responsive to the throttle position and actual engine speed, and a line pressure calculator for producing said second output signal in response to said engine torque and said desired transmission ratio.

11. The system according to claim 9, wherein said fourth means comprises an engine torque detector for detecting engine torque responsive to the throttle position, and a line pressure calculator for producing said second output signal in response to said engine torque and said desired transmission ratio.

* * * * *